(12) United States Patent
Kramer

(10) Patent No.: US 6,986,912 B2
(45) Date of Patent: *Jan. 17, 2006

(54) PEANUT POWDER COMPOSITIONS AND METHODS OF MAKING SAME

(76) Inventor: Sigmund Kramer, 6184 Rue Du Lac, West Bloomfield, MI (US) 48323

(*) Notice: Subject to any disclaimer, the term of this patent is extended or adjusted under 35 U.S.C. 154(b) by 0 days.

This patent is subject to a terminal disclaimer.

(21) Appl. No.: 10/800,485

(22) Filed: Mar. 15, 2004

(65) Prior Publication Data

US 2004/0175485 A1 Sep. 9, 2004

Related U.S. Application Data

(63) Continuation of application No. 09/853,210, filed on May 11, 2001, now Pat. No. 6,716,471.

(60) Provisional application No. 60/203,770, filed on May 12, 2000.

(51) Int. Cl.
A23G 3/00 (2006.01)
A23L 1/36 (2006.01)

(52) U.S. Cl. ............... 426/584; 426/589; 426/593; 426/590; 426/632; 426/463; 426/464; 426/466; 426/518; 426/473

(58) Field of Classification Search ......... 426/629, 426/632, 640, 598, 590, 584, 591, 593, 615
See application file for complete search history.

(56) References Cited

U.S. PATENT DOCUMENTS

| | | |
|---|---|---|
| 617,266 A | 1/1899 | Watson |
| 2,511,119 A | 6/1950 | Mitchell, Jr. |
| 2,560,509 A | 7/1951 | Harris |
| 3,317,325 A | 5/1967 | Durst |
| 3,619,207 A | 11/1971 | Dzurik |
| 3,639,129 A | 2/1972 | Mustakas et al. |
| 3,800,056 A | 3/1974 | Mitchell, Jr. |
| 3,829,589 A * | 8/1974 | Matsunaga ............ 426/427 |
| 3,901,983 A | 8/1975 | Matsunaga |
| 3,947,599 A | 3/1976 | Mitchell, Jr. |
| 4,025,658 A | 5/1977 | Pominski et al. |
| 4,031,261 A | 6/1977 | Durst |
| 4,052,516 A | 10/1977 | Mitchell |
| 4,075,361 A | 2/1978 | Oberg |
| 4,113,889 A | 9/1978 | Baxley |
| 4,119,740 A * | 10/1978 | Crespo ............ 426/631 |
| 4,190,577 A | 2/1980 | Steele et al. |
| 4,335,153 A | 6/1982 | Rikon et al. |
| 4,355,051 A | 10/1982 | Pominski et al. |
| 4,418,084 A | 11/1983 | Murray et al. |
| 4,423,085 A | 12/1983 | Chen et al. |
| 4,639,374 A | 1/1987 | Matsunobu et al. |
| 4,650,857 A | 3/1987 | May |
| 4,659,583 A | 4/1987 | Hashimoto et al. |
| 4,667,015 A | 5/1987 | May |
| 4,871,566 A | 10/1989 | Farnum et al. |
| 5,079,027 A | 1/1992 | Wong |
| 5,268,192 A * | 12/1993 | Zook et al. ............ 426/633 |
| H1636 H | 3/1997 | Sevenants et al. |
| 5,656,321 A | 8/1997 | Berger et al. |
| 5,690,987 A | 11/1997 | Parker et al. |
| 5,753,296 A | 5/1998 | Girsh |
| 5,807,602 A | 9/1998 | Beutler et al. |
| 5,863,588 A | 1/1999 | Wittrock |
| 5,972,410 A | 10/1999 | Tsuzaki et al. |
| 5,993,795 A | 11/1999 | Osawa et al. |
| 6,013,294 A | 1/2000 | Bunke et al. |
| 6,036,984 A | 3/2000 | Sartorio et al. |
| 6,197,356 B1 | 3/2001 | Girsh |
| 6,716,471 B2 * | 4/2004 | Kramer ............ 426/584 |

FOREIGN PATENT DOCUMENTS

| | | | |
|---|---|---|---|
| DE | 2409623 A | * | 9/1974 |
| GB | 822614 | | 10/1959 |
| JP | 74008855 B | * | 2/1974 |

OTHER PUBLICATIONS

International Search Report.

* cited by examiner

Primary Examiner—Keith Hendricks
Assistant Examiner—Maureen Donovan
(74) Attorney, Agent, or Firm—Rader, Fishman & Grauer PLLC; James K. Kamp, Esq.

(57) ABSTRACT

The present Invention comprises compositions and methods for preparing foods and beverages using novel peanut powder compositions. Embodiments of the Invention include, among others, flavorful foods and beverages made with cocoa and peanut powders.

10 Claims, No Drawings

PEANUT POWDER COMPOSITIONS AND METHODS OF MAKING SAME

CROSS REFERENCE TO RELATED APPLICATION

This application is a continuation application and claims priority from U.S. application Ser. No. 09/853,210, filed May 11, 2001, now U.S. Pat. No. 6,716,471 and also claims priority to U.S. Provisional Application No. 60/203,770, filed May 12, 2000, the entire teachings of which are incorporated herein by reference.

FIELD OF THE INVENTION

The present Invention relates to the field of foods and beverages. In particular, the present Invention relates to compositions and methods for preparing foods and beverages using novel peanut powder compositions.

BACKGROUND OF THE INVENTION

The desirability of flavorful foods or beverages that contain high quality protein is well known. In particular, there has been considerable effort directed to the use of nut proteins, such as from peanuts, in such foods. By way of examples only, Watson (U.S. Pat. No. 617,266) mentions manufacturing flour or meal from peanuts for use as foodstuffs or mixing with wheaten flour or other foodstuffs. Mitchell (U.S. Pat. No. 2,511,119) mentions an aqueous peanut emulsion for making foods and drinks. Pominski (U.S. Pat. No. 4,025,658) mentions peanut flour for making peanut milks. Baxley (U.S. Pat. No. 4,113,889) mentions peanut flour for baking or making milk substitutes.

Despite these efforts, there remains a need for novel peanut powder compositions and related food and beverage compositions, particularly those that use cocoa powders. Such compositions may increase agricultural production of peanuts; increase consumption of the more nutritional parts of peanuts; and increase consumption of peanut by-products, while providing desirable foods and beverages to the consuming public.

SUMMARY OF THE INVENTION

The present Invention comprises compositions and methods for preparing foods and beverages using novel peanut powder compositions. In one preferred embodiment, the Invention is comprised of one or more flavorful peanut powder composition that may contain peanut products, sweeteners, or other ingredients. Thus, embodiments of the Invention comprise alternative peanut products that can be used, for example, as foods and beverages that are refreshing, novel, pleasing and nutritious.

DETAILED DESCRIPTION OF THE PREFERRED EMBODIMENTS

The present Invention comprises compositions and methods for preparing foods and beverages using novel peanut powder compositions. By way of example only, and without limitation, in one embodiment, the Invention is comprised of a free-flowing powder composition which can be mixed with one or more liquids or solid materials to produce one or more novel foods or beverages. In one embodiment, the Invention is comprised of a novel peanut powder, which may be prepared by the following method, among other methods:

Raw peanuts are obtained and roasted at temperatures not to exceed 300 degrees Fahrenheit for a period of approximately 15 minutes. The peanuts are allowed to remain in the roasters for approximately an additional 5 minutes for cooling. The roasted peanuts are cooled, for example, by passing through a cooling system known to those of ordinary skill in the art, which brings the temperature of peanuts down to approximately 120 to 130 degrees Fahrenheit.

When cooled to the desired temperature, the roasted peanuts are discharged into the gravity separator or destoner, or similar apparatus, the operation of which allows further cooling time and also causes light materials associated with the roasted peanuts to rise and be vacuumed out while heavier materials (like stones and the like) move downward and are discharged. The remaining peanut skins are removed by a blancher, which splits the roasted peanut in half, at which point the skins are aspirated out.

The blanched peanuts are passed over a pick table where more extraneous material is removed manually. The peanuts are also passed through a safe line metal detector that removes ferrous and non-ferrous metals.

A grinder mill then grinds the roasted peanuts to a semi-fine peanut butter paste, by way of example only, to a grind of 8 to 14 mils. A temperature exceeding 165 degrees Fahrenheit is applied at the grinding mill to enhance the killing of any microorganisms.

A high-pressure press is used to press excess peanut oil out of the peanut paste. Different pressures are used to obtain varying degrees of fat content in the peanut powder, as desired. The resulting peanut cake is passed through a crushing device, which pulverizes the cake into a free-flowing powder. Peanut powders may be prepared or obtained by other means known to those of ordinary skill in the art, by way of examples only and without limitation, by obtaining and processing peanut cakes or purchasing suitable peanut powder for blending.

A blender, by way of example only, a ribbon blender, is used to blend the peanut powder with other ingredients as may be desired, for example, with one or more of materials such as fructose, sugar, dextrose, cocoa powder and/or salt). The material is blended, by way of example, for about 5 minutes, the mixing time being consistent as to not affect the finished appearance of the mix. The mix may or may not contain any added artificial flavors or preservatives, as desired. The mix is then ground in a grinder. After grinding, the batch of mix is re-blended for about two minutes, again time being an important factor. The finished blend is then passed through a safeline metal detector, which removes any ferrous and non-ferrous metals.

Thus, the Invention comprises one or more novel peanut powder compositions for use, by way of examples only, by themselves, or mixed with consumable liquids and solids to form foods or beverages containing the peanut powder composition. The following examples further illustrate but do not limit the embodiments of the present Invention.

EXAMPLES OF PEANUT POWDER COMPOSITIONS (in weight per cent)

| Standard Formula - | |
|---|---|
| Peanut Powder | 50–75% |
| Fructose | 15–25% |
| Sugar | 6–10% |

-continued

| | |
|---|---|
| Dextrose | 2–6% |
| Cocoa | 2–6% |
| Salt | 0.25–1.75%. |
| Salt Free Formula (no salt added to the mix) - | |
| Peanut Powder | 50–75% |
| Fructose | 15–25% |
| Sugar | 6–10% |
| Dextrose | 2–6% |
| Cocoa | 2–6%. |
| Decreased/Increased Sugar Formula (sugar content may be varied based on the market targeted) - | |
| Peanut Powder | 40–85% |
| Fructose | 0–25% |
| Sugar | 0–16% |
| Dextrose | 0–8% |
| Cocoa | 2–6% |
| Salt | 0.25–1.75%. |
| Low Fat Formula (made with a low fat peanut powder, e.g., approximately 12% fat) - | |
| Peanut Powder (low fat approx. 12%) | 50–75% |
| Fructose | 15–25% |
| Sugar | 6–10% |
| Dextrose | 2–6% |
| Cocoa | 2–6% |
| Salt | 0.25–1.75%. |
| Reduced Fat Formula (made with a reduced fat peanut powder, e.g., approximately 24% fat) - | |
| Peanut Powder (reduced fat approx. 24%) | 50–75% |
| Fructose | 15–25% |
| Sugar | 6–10% |
| Dextrose | 2–6% |
| Cocoa | 2–6% |
| Salt | 0.25–1.75%. |
| Regular Fat Formula (made with peanut powder with a fat level of approximately 27–37% fat) - | |
| Peanut Powder (approx. 27–37% fat) | 50–75% |
| Fructose | 15–25% |
| Sugar | 6–10% |
| Dextrose | 2–6% |
| Cocoa | 2–6% |
| Salt | 0.25–1.75%. |
| No Cocoa Formula (no cocoa added to the mix and the amount of peanut powder increased) - | |
| Peanut Powder | 50–75% |
| Fructose | 15–25% |
| Sugar | 6–10% |
| Dextrose | 2–6% |
| Salt | 0.25–0.75%. |

Fortified Formula—same Standard Formula but with one or more added vitamins and minerals, by way of examples only, Vitamin A, C, B's, K, or others.

Holistic Formula—same Standard Formula but with one or more added herbs, by way of examples only, ginseng, echinacea, gingko biloba, kava kava, St. John's wort, grape seed, or others.

Weight Training Formula—same Standard Formula but with one or more added vitamins and amino acids, which may be beneficial for building muscles, by way of examples only, fumaric acid, L-cystine, L-cysteine HCl, L-leucine, L-tyrosine, mannitol, Vitamins A, C, B's, K, or others.

Weight Loss Formula—same Standard Formula but with one or more added chemicals, which may assist with or enhance weight loss, by way of examples only, white willow bark, ephedrine, caffeine, ginseng, vitamins, minerals, or others.

Vanilla-flavored Formula (cocoa replaced with natural vanilla flavor)—

| | |
|---|---|
| Peanut Powder | 50–75% |
| Fructose | 15–25% |
| Sugar | 6–10% |
| Dextrose | 2–6% |
| Natural Vanilla Flavor | 0.05–4% |
| Salt | 0.25–1.75% |

The Invention is further comprised of one or more beverage compositions containing an embodiment of the novel peanut powder composition Invention blended with or in a consumable liquid. The following examples further illustrate but do not limit such embodiments of the present Invention:

Example 1

1 to 4 tablespoons (9 to 38 grams) of peanut powder composition blended with 8 oz. of water. Either prepared hot or cold.

Example 2

1 to 4 tablespoons (9 to 38 grams) of peanut powder composition blended with 8 oz. of skim milk. Either prepared hot or cold.

Example 3

1 to 4 tablespoons (9 to 38 grams) of peanut powder composition blended with 8 oz. of 1% milk. Either prepared hot or cold.

Example 4

1 to 4 tablespoons (9 to 38 grams) of peanut powder composition blended with 8 oz. of 2% milk. Either prepared hot or cold.

Example 5

1 to 4 tablespoons (9 to 38 grams) of peanut powder composition blended with 8 oz. of whole milk. Either prepared hot or cold.

Example 6

1 to 4 tablespoons (9 to 38 grams) of peanut powder composition blended with 1 oz. any type of alcohol (e.g., whiskey, gin, vodka, rye, rum, etc.) 4 oz. of either water, 1%, 2%, skim or whole milk.

Example 7

1 to 4 tablespoons (9 to 38 grams) of peanut powder composition blended with 8 oz. of carbonated water. Prepared cold.

Example 8

1 to 4 tablespoons (9 to 38 grams) of peanut powder composition blended with 8 oz of soya milk. Either prepared hot or cold.

Other embodiments of the present Invention comprise one or more food compositions containing an embodiment of the novel peanut powder composition Invention. By way of example only, and without limitation, one such embodiment is an ice cream product comprised of a peanut powder composition and an ice cream base. Such ice cream bases are well-known to those of ordinary skill in the art and may contain one or more ingredients such as dairy cream, nonfat skim milk, sugars, stabilizers and emulsifiers, and solid additives or fillers (by way of example only, sweet cream buttermilk solids).

The following example further illustrates but does not limit such embodiments of the present Invention:

Ice Cream Formula (Peanut powder composition portion may be one or more of the embodiments, including without limitation, the Standard Formula and other examples described above)—

| Essence of Roasted Peanut Oil | 0–15% |
|---|---|
| Peanut powder composition | 2–30% |
| Ice Cream Base Mix | 70 to 98%. |

Preferred embodiments of the present Invention have been disclosed. A person of ordinary skill in the art would realize, however, that certain modifications would come within the teachings of this Invention, and the following claims should be studied to determine the true scope and content of the invention. In addition, the compositions and methods of the present Invention can be incorporated in the form of a variety of embodiments, only a few of which are described herein. It will be apparent to the artisan that other embodiments exist that do not depart from the spirit of the Invention. Thus, the described embodiments are illustrative and should not be construed as restrictive.

What is claimed is:

1. A peanut powder composition comprised of:
   50% to 75% peanut powder by weight;
   15% to 25% fructose by weight;
   6% to 10% sugar by weight;
   2% to 6% dextrose by weight;
   2% to 6% cocoa powder by weight; and
   0% to 1.75% salt by weight.

2. The peanut powder composition of claim 1, further comprised of one or more added proteins.

3. The peanut powder composition of claim 1, further comprised of one or more added sources of caffeine.

4. The peanut powder composition of claim 1, further comprised of natural flavors or artificial flavors.

5. A peanut powder composition comprised of:
   50% to 75% peanut powder by weight;
   2% to 6% cocoa powder by weight;
   one or more artificial sweetener; and
   0% to 1.75% salt by weight.

6. A peanut powder composition comprised of:
   40% to 85% peanut powder by weight;
   0% to 25% fructose by weight;
   0% to 10% sugar by weight;
   0% to 6% dextrose by weight;
   2% to 6% cocoa; and
   0% to 1.75% salt.

7. A beverage composition comprised of 9 to 38 grams of the peanut powder composition of claim 1 blended in at least 6 ounces of a consumable liquid.

8. The beverage composition of claim 7, wherein the consumable liquid is comprised of skim milk, reduced fat milk, whole milk, soya milk, carbonated water, non-carbonated water, or mineral water.

9. A beverage composition comprised of 9 to 55 grams of the peanut powder composition of claim 1 blended in at least 6 ounces of a consumable liquid.

10. The beverage composition of claim 9, wherein the consumable liquid is comprised of skim milk, reduced fat milk, whole milk, soya milk, carbonated water, non-carbonated water, or mineral water.

* * * * *